US008732247B2

(12) United States Patent
Dittmer-Roche

(10) Patent No.: US 8,732,247 B2
(45) Date of Patent: May 20, 2014

(54) SYSTEM AND METHOD OF SIMULTANEOUS COLLABORATION

(76) Inventor: Bjorn Michael Dittmer-Roche, New York, NY (US)

( * ) Notice: Subject to any disclaimer, the term of this patent is extended or adjusted under 35 U.S.C. 154(b) by 633 days.

(21) Appl. No.: 12/892,038

(22) Filed: Sep. 28, 2010

(65) Prior Publication Data
US 2011/0078246 A1 Mar. 31, 2011

Related U.S. Application Data

(60) Provisional application No. 61/246,430, filed on Sep. 28, 2009.

(51) Int. Cl.
*G06F 15/16* (2006.01)
*H04L 29/06* (2006.01)

(52) U.S. Cl.
CPC ...... *H04L 65/4015* (2013.01); *H04L 29/06401* (2013.01); *H04L 29/06027* (2013.01)
USPC ............ 709/205; 709/203; 709/248; 709/201

(58) Field of Classification Search
USPC ........... 709/201, 203, 205, 248; 715/751, 255
See application file for complete search history.

(56) References Cited

U.S. PATENT DOCUMENTS

| | | | | |
|---|---|---|---|---|
| 4,196,470 A | * | 4/1980 | Berg | 710/260 |
| 5,870,764 A | * | 2/1999 | Lo et al. | 1/1 |
| 5,897,666 A | * | 4/1999 | Mallick et al. | 711/217 |
| 7,092,973 B2 | * | 8/2006 | Muehl et al. | 1/1 |
| 7,979,368 B2 | * | 7/2011 | Kapoor et al. | 706/20 |
| 8,010,487 B2 | * | 8/2011 | Richardson et al. | 707/622 |
| 8,015,505 B1 | * | 9/2011 | Philbrick et al. | 715/809 |
| 8,121,990 B1 | * | 2/2012 | Chapweske et al. | 707/695 |
| 8,176,415 B2 | * | 5/2012 | Lefebvre | 715/243 |
| 2002/0147611 A1 | * | 10/2002 | Greene et al. | 705/1 |
| 2002/0169644 A1 | * | 11/2002 | Greene | 705/7 |
| 2003/0061081 A1 | * | 3/2003 | Kellond et al. | 705/7 |
| 2004/0122869 A1 | * | 6/2004 | Muehl et al. | 707/201 |
| 2005/0138186 A1 | * | 6/2005 | Hesselink et al. | 709/229 |
| 2005/0278642 A1 | * | 12/2005 | Chang et al. | 715/751 |
| 2006/0059412 A1 | * | 3/2006 | Lefebvre | 715/500 |
| 2006/0200260 A1 | * | 9/2006 | Hoffberg et al. | 700/86 |
| 2007/0101256 A1 | * | 5/2007 | Simonyi | 715/511 |
| 2007/0106752 A1 | * | 5/2007 | Moore | 709/217 |
| 2007/0118572 A1 | * | 5/2007 | Fischer et al. | 707/201 |
| 2007/0255787 A1 | * | 11/2007 | Richardson et al. | 709/204 |
| 2009/0157811 A1 | * | 6/2009 | Bailor et al. | 709/204 |
| 2009/0199090 A1 | * | 8/2009 | Poston et al. | 715/255 |
| 2009/0327358 A1 | * | 12/2009 | Lukiyanov et al. | 707/203 |
| 2011/0208805 A1 | * | 8/2011 | Kasetty et al. | 709/203 |

* cited by examiner

*Primary Examiner* — Ian N Moore
*Assistant Examiner* — Phong La

(57) ABSTRACT

A system and method of simultaneous collaboration is described. The described systems and methods can work with virtually any document structure and do not require advance locking. A plurality of possibly hierarchical, possibly overlapping domains within the document structure is defined. The server handling the simultaneous collaboration requests must keep track of conflicts in edits using the domain information and inform clients whether the edits have been accepted or rejected based on whether or not the edits cause conflicts. A well-designed domain structure as described will avoid conflicts.

24 Claims, 14 Drawing Sheets

501. Edit initiates in the first client (Client A) and is copied both to the sandbox of the the first client and the server.

503a. If the server verifies that the edit does not conflict with any other pending edits, the server passes the edit to the second client (Client B), and an acknowledgement to Client A. At this point both clients can safely apply the edit to the document data model.

502. The Edit now resides in both the Server and the sandbox of Client A.

503b. If the server determines that the edit does cause a conflict, the server signals client A to undo the edit (if necessary) and flush it. It will not be committed to the document data model. Only in this relatively rare case, might user interaction be warranted.

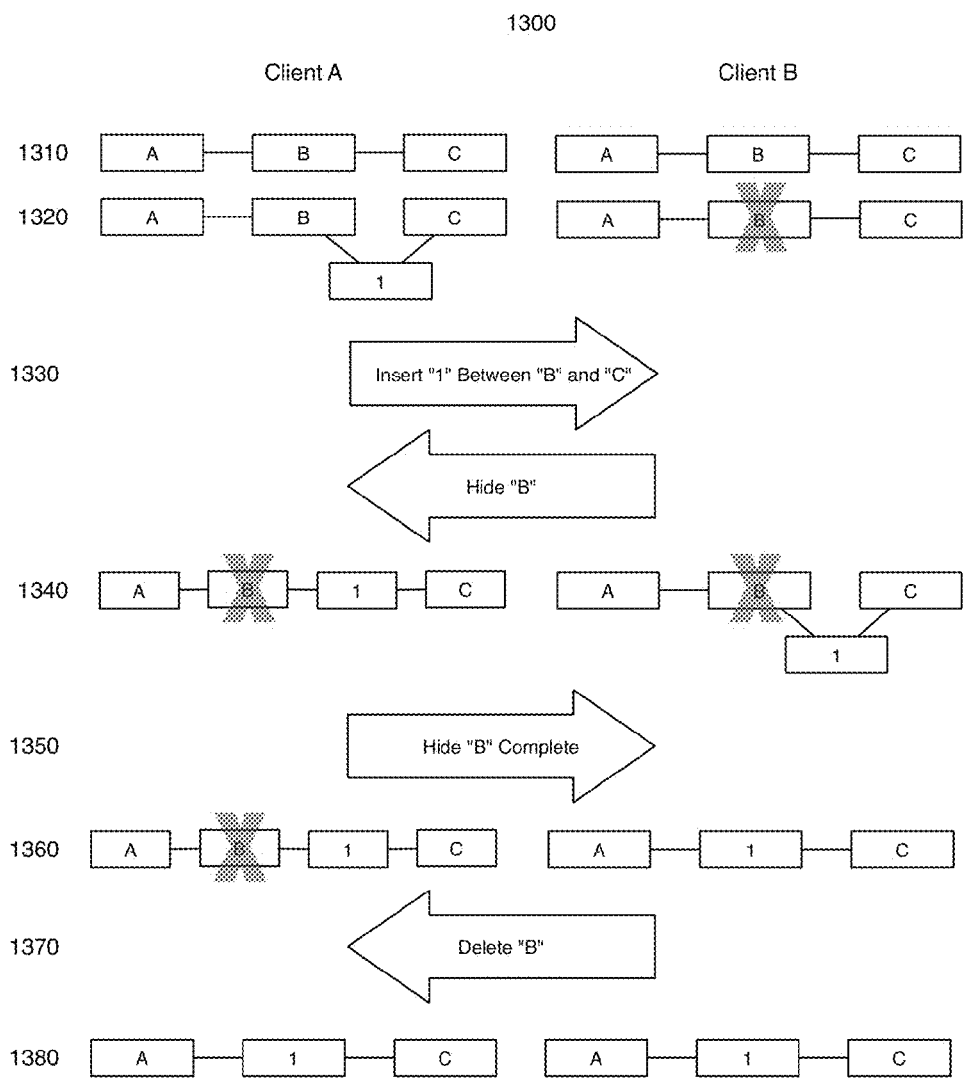

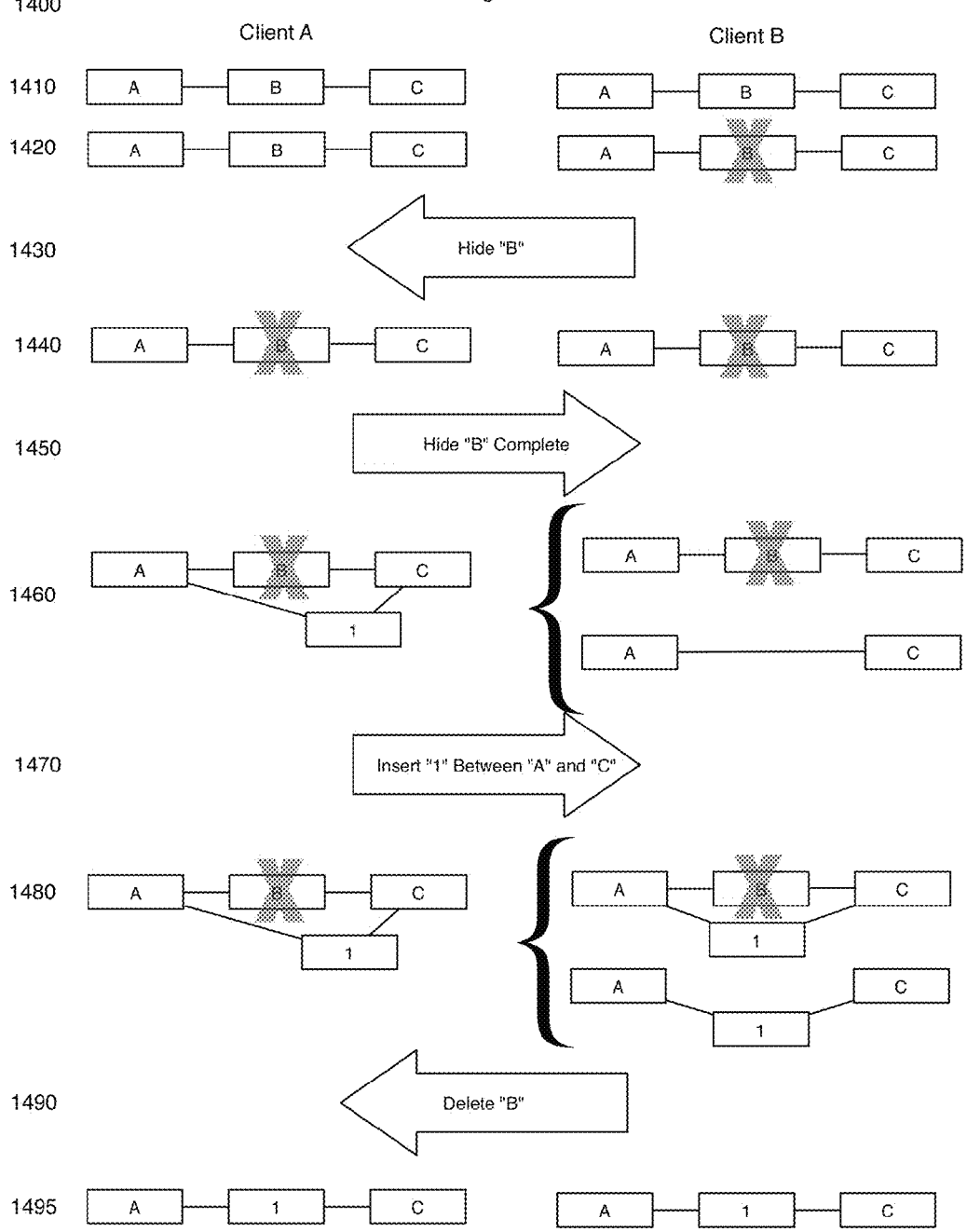

SYSTEM AND METHOD OF SIMULTANEOUS COLLABORATION

CROSS-REFERENCE TO RELATED APPLICATIONS

This application claims priority to U.S. Provisional Patent No. 61/246,430 titled "System and Method of Simultaneous Collaboration" filed Sep. 28, 2009. The contents of this prior application are incorporated herein in their entirety.

BACKGROUND

The present invention relates to systems and methods for simultaneous collaboration.

Many current collaboration and "versioning" tools have limitations. In the simplest example, such collaborative tools will have one user "lock" a file or group of files, preventing other users from making changes until someone, usually the original user, "unlocks" the file. This unlocking may be done manually by the user or automatically by the software they are using. This system of locks works well when the likelihood of any two users wanting to edit the same file at the same time is small, but becomes cumbersome and even prohibitive as this likelihood increases. It can also be problematic when manual unlocking is required and users forget to unlock files they are done working on.

Another technique, used in many software revision control systems (AKA Software Configuration Management Systems), is to allow all users to edit a file while checking for conflicting changes when the users save their changes to the central "repository." A conflicting change, in this case, is any change that affects the same file, or the same section of the same file. This works well for expert systems where users are capable of comparing the data manually and dealing with the conflicts themselves, and when conflicts are unlikely. However, the system does not work well for arbitrary binary data where conflicts are hard to understand and resolve, or situations where non-experts are using the system.

Neither of these techniques is adequate for real-time collaboration, because they involve manipulation of entire files. For real-time collaboration a technique is required that does not demand the transfer of entire files and can work with a wide variety of data-types, including binary data. Moreover, we would like to minimize the possibility of conflicts, and allow for easy resolution of conflicts on the occasions that they do occur.

It is possible to extend the above techniques such that instead of files, we work with relatively small chunks of data, such as database entries, which together form a complete set of data. This complete set may appear to the user to be a file, so, to avoid confusion, we will call the complete set a document. This technique may be more than adequate for implementing many types of documents, such as a simple spreadsheet, where each cell in the table corresponds to a database entry, and each chunk of data can be locked while one user is editing it. This allows other users to edit other entries without risk of conflict, and in some cases, this is sufficient. The risk of two users wanting to edit the same entry at the same time has been reduced simply because the granularity has been improved. This system can be further improved upon in straightforward ways, if necessary: for example, locks can timeout if the UI on the machine which has the lock is idle; users can request locks from each other if someone has a lock that they need, or administrators can override locks as needed. This overcomes some of the obstacles; however, there are still cases where edits to the document may affect large amounts of data in the database, or the complexity of the data-structures is limited by the need to segregate "lockable" items, where this technique has significant limitations. In our spreadsheet example, moving multiple cells, though possible with multiple locks, becomes difficult. More difficult are operations such as inserting table rows and columns and formatting multiple cells. This design does not lend itself well to formats such as text documents where insertion and deletion constantly change the structure of the document. Therefore, the document design is dependent on the collaboration technique and may be limited in complexity. Another issue with this technique is the delay between requesting the lock and obtaining it, which must be very short in order for this technique to be convenient and user-friendly.

One possible solution is to send change information and have each client transform that information into a form that is relevant to its current state, even if its current state is different from the state of the original client. While this solution, and its extensions, called Operational Transformation (OT) is a well-established and highly developed art, it does have at least two drawbacks: 1. OT requires either the development of a large number of transformation functions, or it requires all edits to be reduced to a small number of extremely elementary edits, and 2. OT assumes that the document data can be represented in a linear fashion. While the second condition is almost always possible to meet, it is not always practical for documents with complex structures, for example, documents with complex embedded dictionaries.

SUMMARY

It would be desirable to find a new technique for collaboration that reduces the amount of information sent and allows for support of complex data-structures without the need to perform locks, and with a minimum likelihood of conflicts. This application describes several techniques that allow collaborative editing of a document without locks and which works with virtually any real-world document type. The first family of techniques involves centralized conflict checking and low probability of conflicts. It has many advantages for real world systems. The second system is easy to implement, requires no central conflict checking, and may be familiar to anyone who has worked with Operational Transformations.

BRIEF DESCRIPTION OF DRAWINGS

FIG. 13 illustrates how to correct the issue demonstrated in FIG. 12. It represents the correct way to handle a deletion by hiding data from an end user, according to an illustrative embodiment; and FIG. 14 illustrates how a deletion is handled by hiding data from an end user, according to an illustrative embodiment.

DETAILED DESCRIPTION OF CERTAIN ILLUSTRATIVE EMBODIMENTS

In the following detailed description, certain details are set forth in order to provide a thorough understanding of various disclosed embodiments. However, one skilled in the art will recognize that embodiments may be practiced without one or more of these specific details, or with other methods, components, etc. In other instances, well-known structures and methods associated with computers, computer software, networking, and computing devices have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The section headings provided herein are for convenience only and do not alter or limit the scope or meaning of the embodiments of the present disclosure.

Description of an Example Computer System

Figure 1:
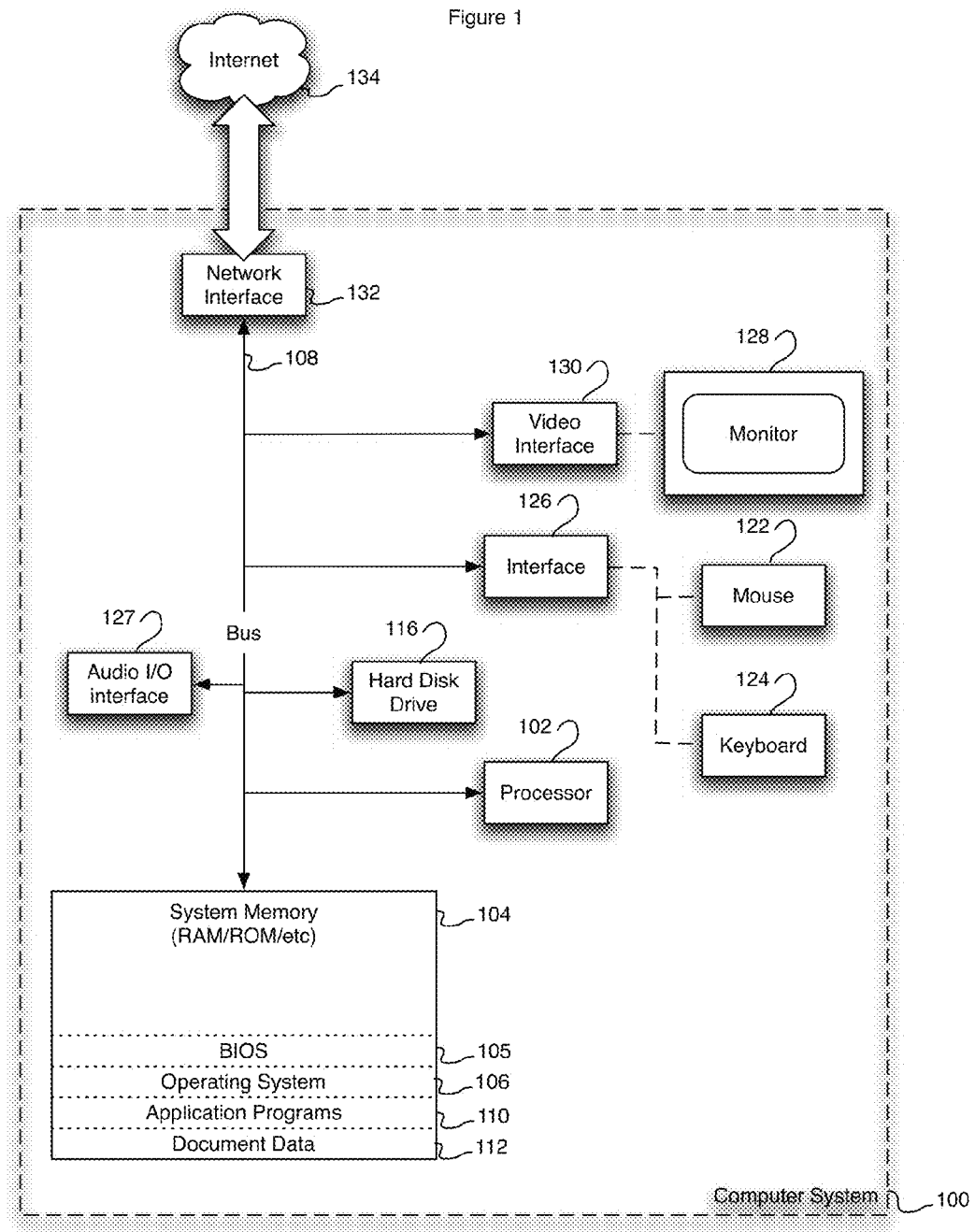
FIG. 1 is an illustration of a computer system configured for editing documents, according to an illustrative embodiment.
Figure 2:
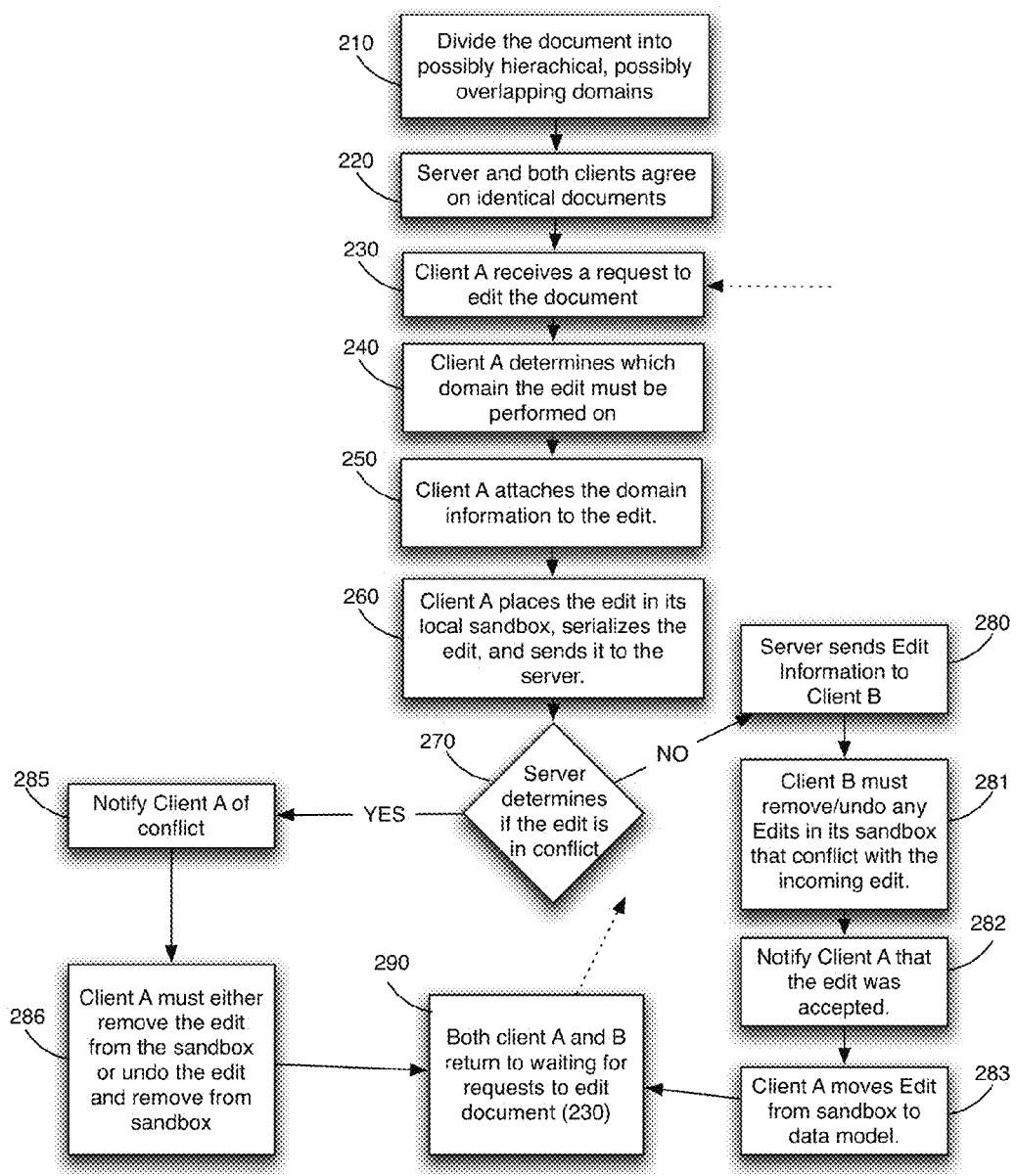
FIG. 2 is a process flow diagram for a method of simultaneous collaboration, according to an illustrative embodiment.

FIG. 1 and the following discussion provide a brief, general description of a computer system 100 configured for editing documents, such as word processing documents, spreadsheet documents, business oriented software, digital audio/video software or any other type of desktop software that may require or benefit from collaborative features. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including digital audio and/or video editing hardware, handheld devices, multiprocessor systems, microprocessor-based or programmable consumer electronics, personal computers ("PCs"), network PCs, embedded systems, "set top boxes," and the like. The embodiments can be practiced in distributed computing environments where tasks or modules are performed by remote processing devices, which are linked through a communications network. In a distributed computing environment, program modules may be located in both local and remote memory storage devices.

FIG. 1 shows a computer system 100, which comprises a computer. The computer system 100 and this method for simultaneous collaboration will be described in greater detail below. The computer system 100 may take the form of a conventional PC, which includes the processor 102, the system memory 104 and a system bus 108 that couples various system components including the system memory 104 to the processing unit 102. The computer system 100 will at times be referred to in the singular herein, but this is not intended to limit the embodiments to a single computing device, since in certain embodiments, there will be more than one networked computing device involved. The processor 102 may be any logic processing unit, such as one or more central processing units (CPUs), digital signal processors (DSPs), application-specific integrated circuits (ASICs), field programmable gate arrays (FPGAs), Graphics Processing Units (GPUs) etc. Unless described otherwise, the construction and operation of the various blocks shown in FIG. 1 may be of conventional design. As a result, such blocks need not be described in further detail herein, as they will be understood by those skilled in the relevant art. The system bus 108 can employ any known bus structures or architectures, including a memory bus with memory controller, a peripheral bus, and a local bus. The system memory 104 may include read-only memory ("ROM") and random access memory ("RAM"). A basic input/output system ("BIOS") 105, which can form part of the ROM, contains basic routines that may help transfer information between elements within the computer system 100 (e.g., during start-up).

The computer system 100 may also includes a hard disk drive 116 for reading from and writing to a hard disk. Though not shown, the computer system 100 may further or alternatively include other storage devices, such as an optical disk drive and/or a flash-based storage device. The hard disk drive 116 communicates with the processor 102 via the system bus 108. The hard disk drive 116 may include interfaces or controllers (not shown) coupled between the hard disk drive 116 and the system bus 108. The hard disk drive 116, and its associated computer-readable media may provide nonvolatile storage of computer-readable instructions, document data files 112, program modules and other data for the computer system 100. A variety of program modules can be stored in the system memory 104, including an operating system 106, one or more application programs 110. In such an embodiment, this application program 110 may provide much of the functionality described below with reference to FIGS. 2 through 14. While shown in FIG. 1 as being stored in the system memory 104, the operating system 106, application programs 110, and document file 112 may be stored in a nonvolatile storage device, such as the hard disk drive 116, or on the network (not shown) or even in the hardware itself. One skilled in the relevant art will appreciate that this is just one possible organization of data in a computer system. A user can enter commands and information into the computer system 100 using a mouse 122 and/or a keyboard 124. Other input devices can include a microphone, other musical instruments, scanner, camera, etc. In one embodiment, one or more of these input devices may be used in order to interact with and edit the document data 112. These and other input devices are connected to the processor 102 through an interface 126 such as a universal serial bus ("USB") interface that couples to the system bus 108, although other interfaces such as another serial port, a game port or a wireless interface may also be used. The computer system 100 may further include an audio I/O interface 127, such as a sound card. The audio I/O 127 may enable a user to import audio from an external source, and/or play audio on one or more speakers. A monitor 128 or other display device may be coupled to the system bus 108 via a video interface 130, such as a video adapter.

Although not shown, the computer system 100 can include other output devices, such as printers. In one embodiment, the computer system 100 operates in a networked environment using one or more logical connections to communicate with one or more remote computers or other computing devices. These logical connections may facilitate any known method of permitting computers to communicate, such as through one or more LANs and/or WANs, such as the Internet 134. In one embodiment, a network interface 132 (communicatively linked to the system bus 108) may be used for establishing communications over the logical connection to the Internet 134. In a networked environment, program modules, application programs, or documents, or portions thereof, can be stored outside of the computer system 100 (not shown). Those skilled in the relevant art will recognize that the network connections shown in FIG. 1 are only some examples of ways of establishing communications between computers, and other connections may be used.

Domains

Experience has shown that the vast majority of real-world data-structures can be broken down into hierarchical domains. For example, this is what has allowed XML (eXtensible Markup Language) to be so widely adopted. We allow an even further generalization to domains that may be overlapping. For example, if our document consists of a dictionary mapping letters to words, we might use the domain of all vowels, {A,E,I,O,U}, and the domain of all letters that follow M alphabetically, that is, all letters M through Z, {M-Z}. In fact, any set of letters, including the set of all letters, is a valid domain. By dividing the document in this way, we can work on the smallest possible domain at any given time, minimizing the chance that two users will try to edit the same part of the same document close enough in time to cause a conflict. Moreover, if the domains are chosen wisely by the designers, users will rarely even attempt to edit overlapping domain at nearly the same time anyway. It may also be advisable to define domains in such a way that the information specifying the domain can be represented compactly so that it can be quickly transported across the network. In practice, this can often be done in a manner within the level of skill of one of ordinary skill in the art. In the above example, 26 bits could be used, one for each letter, to define the domain.

Domain Overlap and Orthogonality

Because we are allowing for cases where domains may overlap, we realize that overlapping domains (including identical domains) are the only domains where conflicts may occur. This simple observation has many powerful consequences. The most important is a simple algorithm for detecting conflicts, which we will discuss later in association with FIG. 4.

Non-overlapping domains are of special interest. If two domains do not overlap we call them "orthogonal." Similarly, two edits which act on orthogonal domains, are also orthogonal. A set of edits which are mutually orthogonal are called an "orthogonal set." We note that orthogonal edits need not be performed in the same order to have the same effect on the document. The same observation applies to undoing and redoing the edits, meaning that orthogonal edits can be undone and redone out-of-order once the domains are determined.

It is possible to build independent editing structures for each orthogonal set, or various combinations of these sets. We have found that by treating some of these sets as described previously (that is, partaking in the collaborative exchange of edits) and leaving other sets out of the exchange, a more powerful workflow can be achieved. For example, in a digital audio workstation, it may be desirable to "mute" one or more components, such as tracks or audio files, and even to be able to undo and redo such mutes, but it is generally not desirable to have those changes propagate to other clients. Similarly, it may be desirable to "Solo" a track (which has the effect of muting other, non-soloed, tracks) without having such solos propagate to other clients. However, as long as mute and solo changes are orthogonal to other changes, we can make those changes locally without having to worry about the impact of those changes on other edits.

In practice, many document editors produce complex edits by combining other, simpler edits. In some cases it may be possible to simplify the data that is stored for undo/redo and transmitted to other clients for collaboration by combining edit data. For example, if multiple sequential edits operate on the same domain, it may be possible to represent them as a single edit. This can be further improved upon by reordering orthogonal data, or even ignoring order information in an orthogonal set of edits.

A desirable property for a collaboration system is for the documents on all clients (and the server, if the server contains document data) to converge. Convergence means that if all pending edits propagate to all clients, then all documents will be contain equivalent data. In some systems it is not possible to prove convergence. However, in our systems, convergence will follow from the fact that only edits that are orthogonal are ever reordered with respect to each other.

Conflicts

A conflict occurs when two clients independently attempt to alter, or edit, the document in incompatible ways. This situation is obviously undesirable and should be prevented or minimized if possible. When avoiding conflicts is impossible, a collaboration system should find the most parsimonious way to handle the conflicts. Depending on the system, it may be desirable to allow the user to handle conflicts manually, as is the case in many SCM systems, or it may be possible and desirable to design a system of automatic conflict resolution, such as one that can choose one of the conflicting edits and reverse or undo the other(s). Such a system is described in this disclosure. It is also possible to design a system that can always prevent conflicts. This can be done with locks or with Operational Transformations. We will show another new technique that allows this to be done without locks and without Operational Transformations.

Sandbox

The present disclosure uses the concept of a "sandbox", a term often used in computer security applications. In computer security, the term sandbox refers to a container in which un-trusted software may be run safely. In the context of this patent application, the term refers to a storage location for unverified edit information. That is, changes to the document that may later be found to be in conflict with edits from another collaborator. The sandbox can be implemented in at least two ways: 1. Edits can be applied to the data model and stored in the sandbox to be "undone" or reversed later if necessary. 2. The document can be viewed through the sandbox as if the sandbox were a "filter" or "lens" through which the data was being viewed. In the second case, if an edit in the sandbox turns out to be in conflict with edits from another collaborator, it can be undone simply by removing it from the sandbox, because data in the document was never touched by the edit. However it is implemented, it is important to realize that sandbox represents edits that have not been verified and any edit in the sandbox may be revoked. However, once verified, edits should move from the sandbox to become part of the document, as we will see.

Embodiment Details

In what follows, we will describe several embodiments. For each embodiment, we will limit our description to ones involving separate computers connected via a network in a client/server paradigm; however, this technique is not limited to traditional computer networks and computers. For example, the messages passed over the network will, with present technology, most likely be passed using TCP/IP or UDP/IP; however, they could be passed using any number of any other techniques, even being printed out on a piece of paper, carried via messenger to the other computer and scanned into the other computer via OCR (Optical Character Recognition). It is even possible for this technique to be used for communication between two or more instances of software running on the same computer, or even two or more data-structures within the same instance of running software. One skilled in the relevant art will recognize that embodiments may be practiced without the specific technologies described, and other technologies may be substituted.

In one embodiment, two computers are attached to a network and communicate via a server. The server may be part of one of the computers and need not be a third computer or even a third piece of software; however, conceptually, it is simpler to separate it out. No assumptions need to be made about the communication protocol. The method (FIG. 2) comprises: 210. dividing the document into possibly hierarchical, possibly overlapping domains, 220. server and both clients agree on an identical document or document data. 230. when one client (we call this client A) receives a request to edit the document. 240, Client A then determines which domain the edit must be performed on, and 250 associates that information with the edit. 260. The edit is placed in Client A's local sandbox, serialized (or "marshaled") and sent to the server along with the now attached domain information. 270 The server then determines if the edit is in conflict (explained elsewhere). If the server determines that there is no conflict, 280, the server passes the edit to the second client, which we call client B. Client B must compare the incoming edit against edits in its local sandbox, if any, before processing, 281. The server then informs client A that the edit was accepted 282, at which point client A commits the edit to its data model 283. If, on the other hand, the server detects a conflict, 285, it simply informs the first client that it must "flush" the edit, which may involve removing it from the sandbox or undoing it, depending on how the sandbox is implemented, 286. At the end of processing a conflicting or a non-conflicting edit, 290, both clients return to waiting for a request to edit the document, which may lead to 230.

Figure 5:
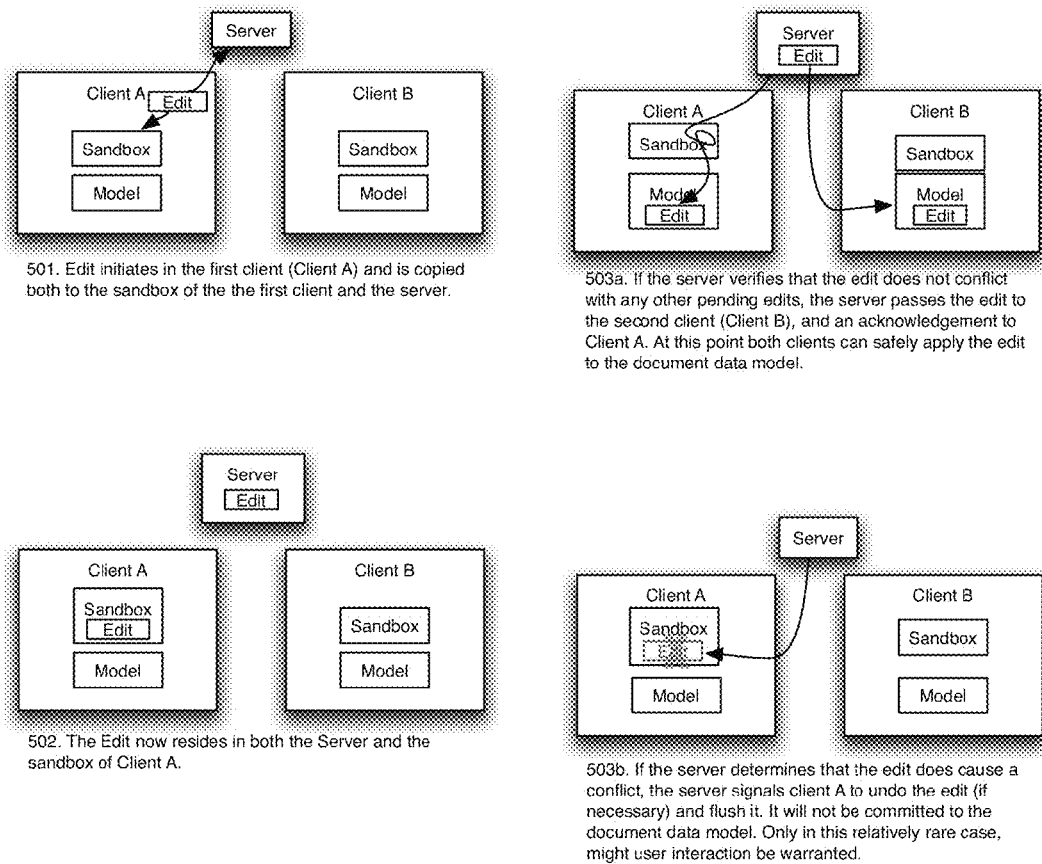
FIG. 5 demonstrates a state-machine like view of this process after the document has been divided into domains and the clients and server have agreed on a document, according to an illustrative embodiment.

FIG. 5 demonstrates a state-machine like view of this process after the document has been divided into domains and the clients and server have agreed on a document. When the first client, client A, receives a request to edit the document, 501, the edit information is sent to both the server and client A's sandbox 502 shows the resulting state. The server must then determine if the edit is in conflict. If it is not in conflict, 503a, the server sends the edit to the second client, Client B, and notifies Client A that the edit was verified. Alternatively, if the edit was found to be in conflict with at least one other edit, 503b, the server signals client A to either remove the edit from it's sandbox or undo it and remove from its sandbox, depending on how the sandbox is implemented.

Obviously, this technique can be extended to more than two clients simply by sending the verified edits out to more clients in step 280. Moreover, the naming of clients "A" and "B" is arbitrary and therefore no generality is lost in the above discussion.

Figure 3:
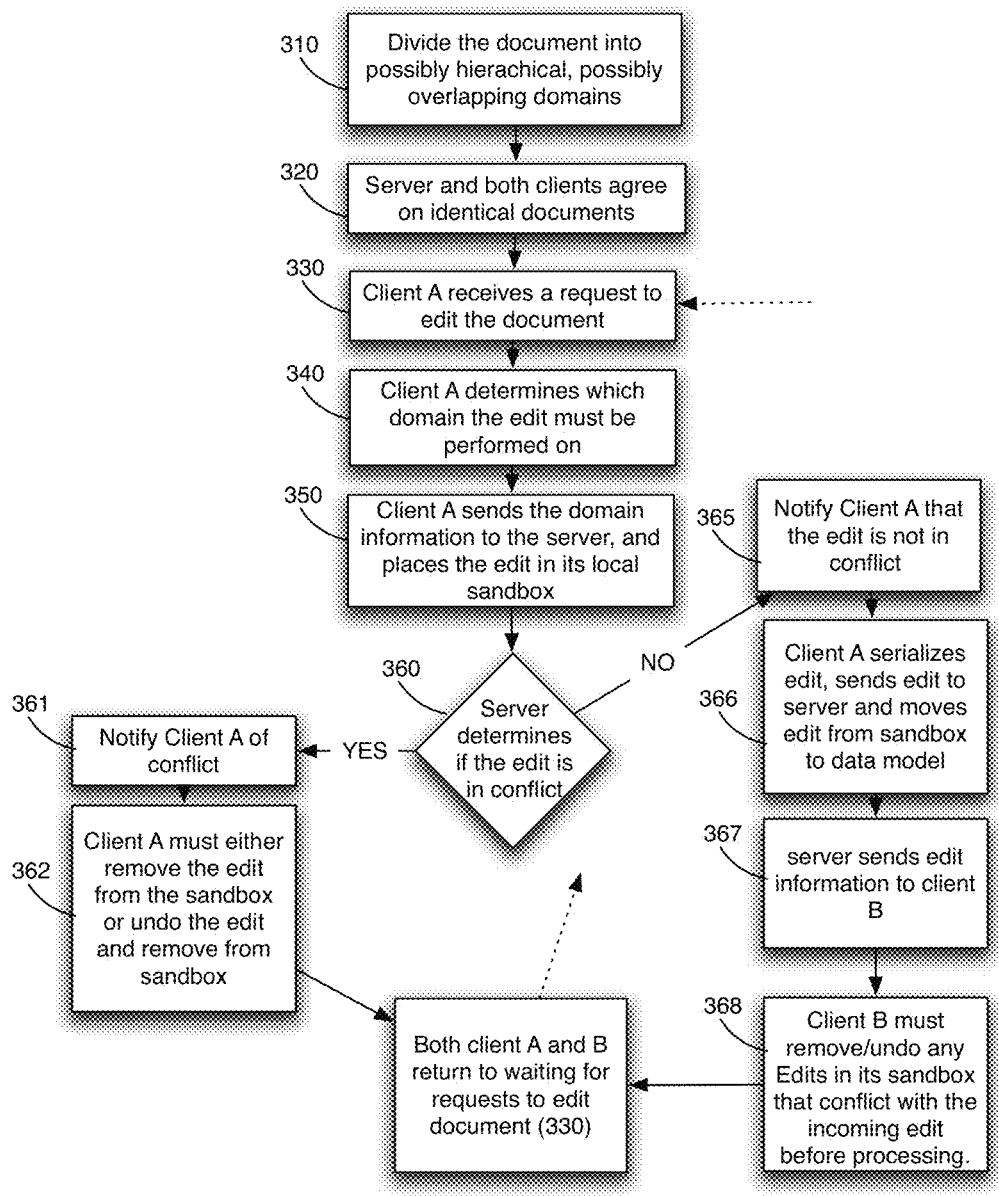
FIG. 3 is a process flow diagram for a variation on the previous method of simultaneous collaboration, according to an illustrative embodiment.

In some cases it may be desirable to only send edit information once the server has verified that the edit is not in conflict. This may be useful for example, if the edit information is large or there is reason to believe that conflicts will be frequent. In this case, the present disclosure can be embodied as shown in FIG. 3.

In another embodiment (not shown in the FIGS.), the clients may communicate with each other directly so that not all edit information needs to pass through the server. In this embodiment, it is possible to send only domain information to the server, rather than complete edit information.

Conflicts in edits may result from one client receiving a request to perform an edit that affects one domain, and, before that edit has been communicated to the second client, the second client receives a request for an edit on an overlapping domain. This situation represents a conflict because the two edits may behave differently depending on what order they are performed in because they both modify the same data, but in a different order. In fact, the edits might not even be compatible with each other, since they were each made without knowledge of the other's existence, and, in general, the end result is not going to be what the user of the software expected or intended. However, in practice, users will typically be working on different parts of the document, and edit information can be transferred from one client to the other quickly, so conflicts will be rare as long as domain information is chosen well.

Figure 4:
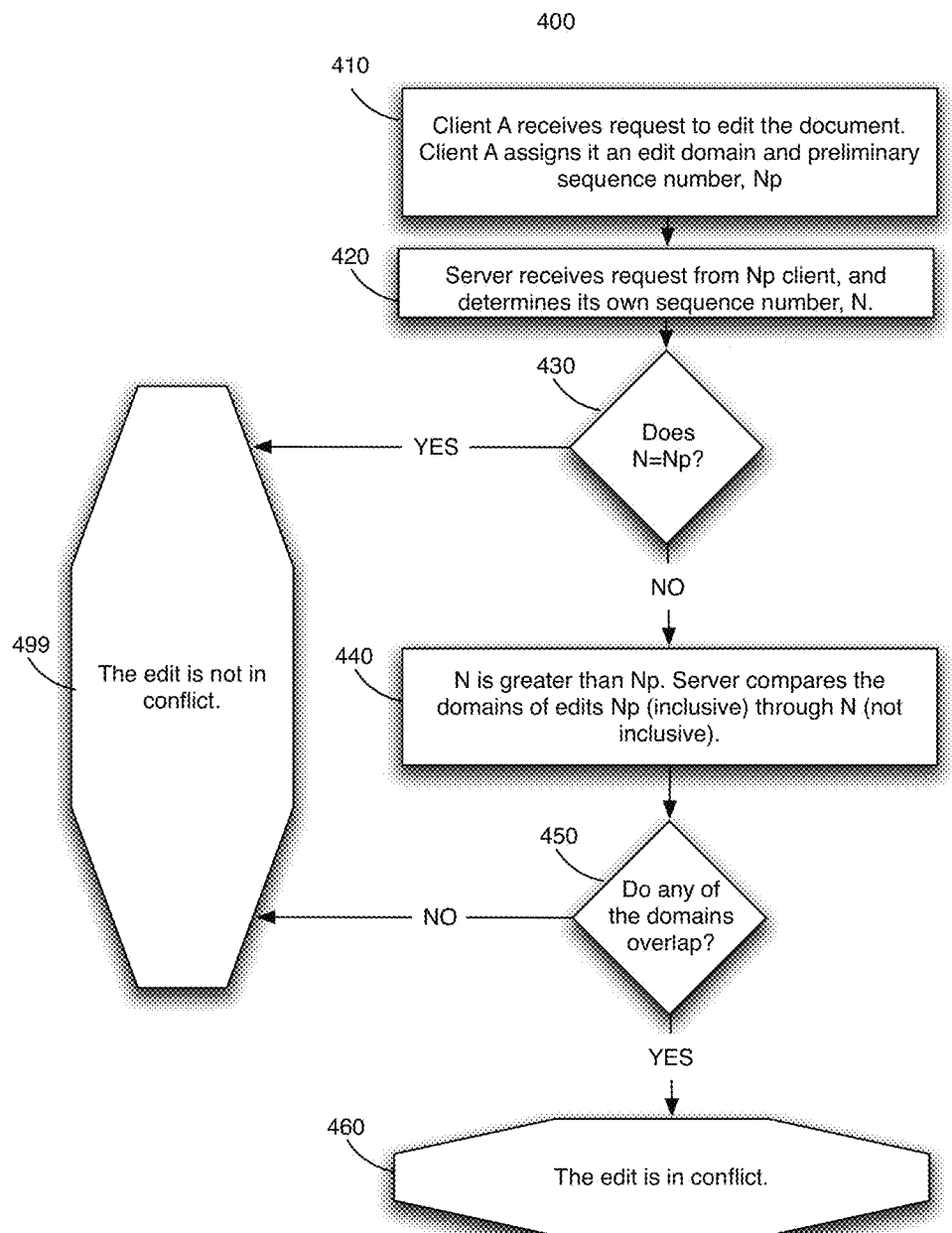
FIG. 4 is a process flow diagram for a method for detecting conflicting edits, according to an illustrative embodiment.

FIG. 4 demonstrates a possible method of detecting conflicting edits. As clients and the server perform edits, we assume that although they might perform them in different orders, each client and the server keeps track of a sequential serial numbers given to the edits by the server. When a client, A, receives a request to edit the document, 410, it assigns the edit domain to the edit and assigns it a preliminary sequence number $N_p$ which is one more than the last edit valid edit that client A knew about (or, if this is the first edit, it may start with an arbitrary but pre-agreed upon number, such as 1 or 0). It attaches this information to the edit, and then serialized the edit and sends the request to validate the edit to the server, 420, which determines the actual sequence number, N. If the actual sequence number matches the preliminary number, then there is no conflict, and we are done, 499, but if they are different, it means that client A was not aware of one or more edits between $N_p$ and N. In this case, the server compares the domains of edits $N_p$ through N, 440, and if there is no overlap, then the edit is not in conflict, 499, but if there is overlap, there is conflict 460.

Figure 6:
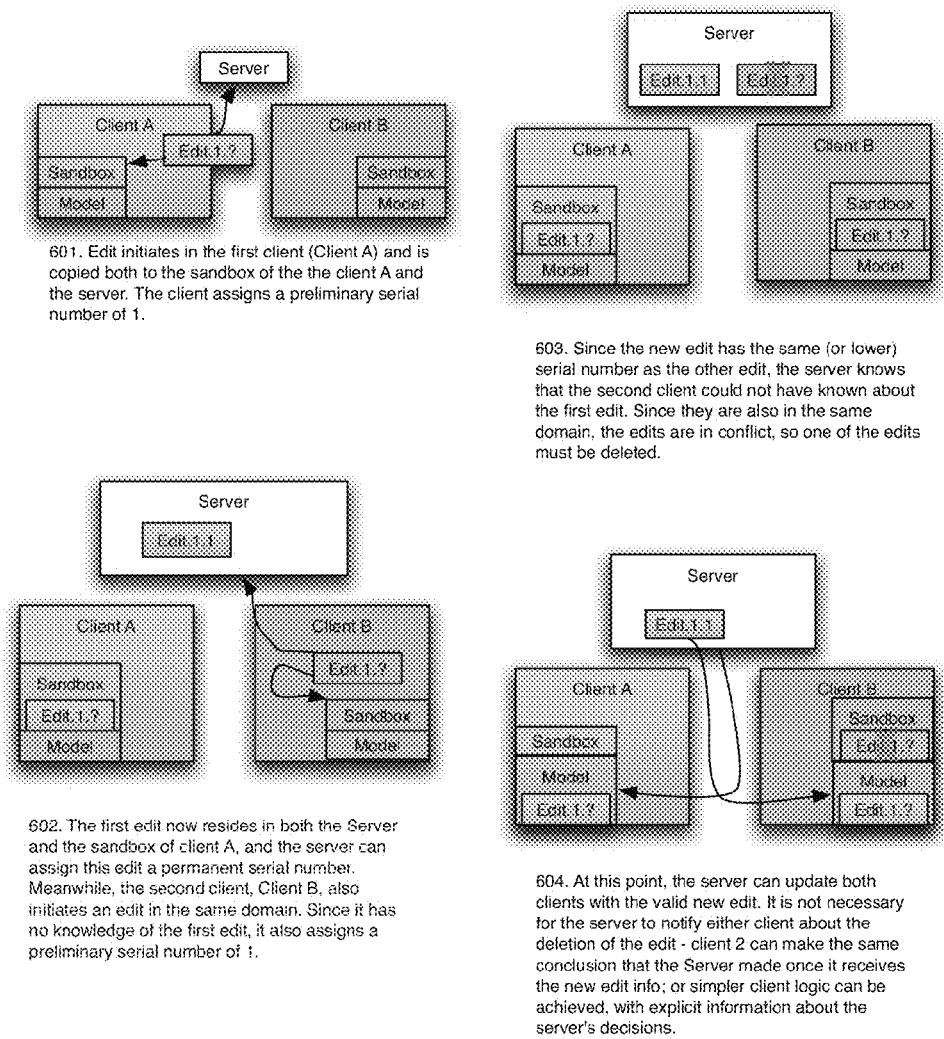
FIG. 6 illustrates an example of how a conflict might occur and how the server would detect it, according to an illustrative embodiment.

FIG. 6 presents an example of how a conflict might occur and how the server would detect it. First, an edit initiates in one client, Client A, and is assigned the preliminary sequence number 1, and, 601, moved to both the server and Client A's sandbox. In 602, another client, Client B, generates an edit on the same domain before it becomes aware of the other edit. It therefore assigns the edit a preliminary serial number of 1, and puts the edit in its sandbox and sends it to the server. In 603, the edits are discovered to be in conflict because they have the same preliminary serial number and act on the same domain. Therefore, one of the edits must be deleted. In 604, the kept edit is sent to Client B and Client A is notified that its edit was verified. Client B may need additional notification to delete its edit depending on the design of the client. It is important to note that by the time the server receives the second edit, it may be well on its way through processing the first edit, so, in this embodiment, the server must store old edit information or at least domain and sequence information, until it verifies that all clients have processed it.

It is not necessary for the server to maintain a copy of the document or data model, although this may be useful in some embodiments.

Dealing with and Preventing Conflicts

Conflicts should rarely occur in this design; however, they may happen and designers of software using the present disclosure must be prepared to deal with them. When conflicts occur, it is up to the software designer to handle it in whatever way is deemed most appropriate. For example, in many instances, it will be appropriate for the software to inform the user that another collaborator was editing the same part of the document at that moment and that the edit had to be reversed. It may or may not be appropriate to offer to try again depending on the context. A particularly savvy application might notice that conflicts are frequently occurring in a particular area of the program and suggest to the user that they work elsewhere or communicate with the other collaborator about who is working on that part of the document. There may be times when simply reversing the edit and not informing the user is appropriate.

Since notification of conflicts can usually be expected to come quickly, it can usually come with context and shouldn't unduly surprise the user. However, it may be wise for an application to note the amount of time that has passed between the request for an edit and the notification that an edit is in conflict. If this time is great, or a number of edits have been performed since the conflicting edit, special action may be required.

If the domains are well designed, they will correspond to parts of the UI (user interface) and domain information can be used to design an additional protocol to mark parts of the UI that other collaborators are working on so that users know that conflicts are likely if they work there. This sort of "advisory locking" may be extended to complete locking in situations where conflicts are, in fact, common. A heterogeneous mandatory/advisory/non locked editing paradigm is an obvious extension of this disclosure. For example, we may wish to augment a non-locking simultaneous editing system as described above with both locking and non-locking editing for a variety of reasons. If the domain is well-designed, such that different parts of the UI correspond to specific domains, a user on one machine may indicate interest in a certain section of the UI by clicking in, or selecting that section. Since this section already defines a domain, the users action can trigger either a request to lock that section or a notification of advisory lock on that section. An actual lock might cause other users to be unable to access that section of the UI, while an advisory lock might make that section of the UI color-coded, or otherwise indicative that some other user is working with it.

Large Changes and Metadata

At times, it will be unavoidable to make changes that require the transfer of large amounts of data. For example, a media editing program, such as a Digital Audio Workstation (DAW) or video editing software may incorporate new media such as audio or video files into the editing document though various means such as import, recording/direct digitization, transferring from another medium, and so on. In these cases, it may not be practical to transfer the raw data to all collaborators in real-time due to bandwidth and/or latency limitations. Therefore, it may not be possible to perform these types of edits directly in real-time. However, we have found that, in practice, it is possible to transfer sufficient metadata in real-time to complete the edit and perform the actual data transfer asynchronously with little to no degradation of performance.

Figure 7:
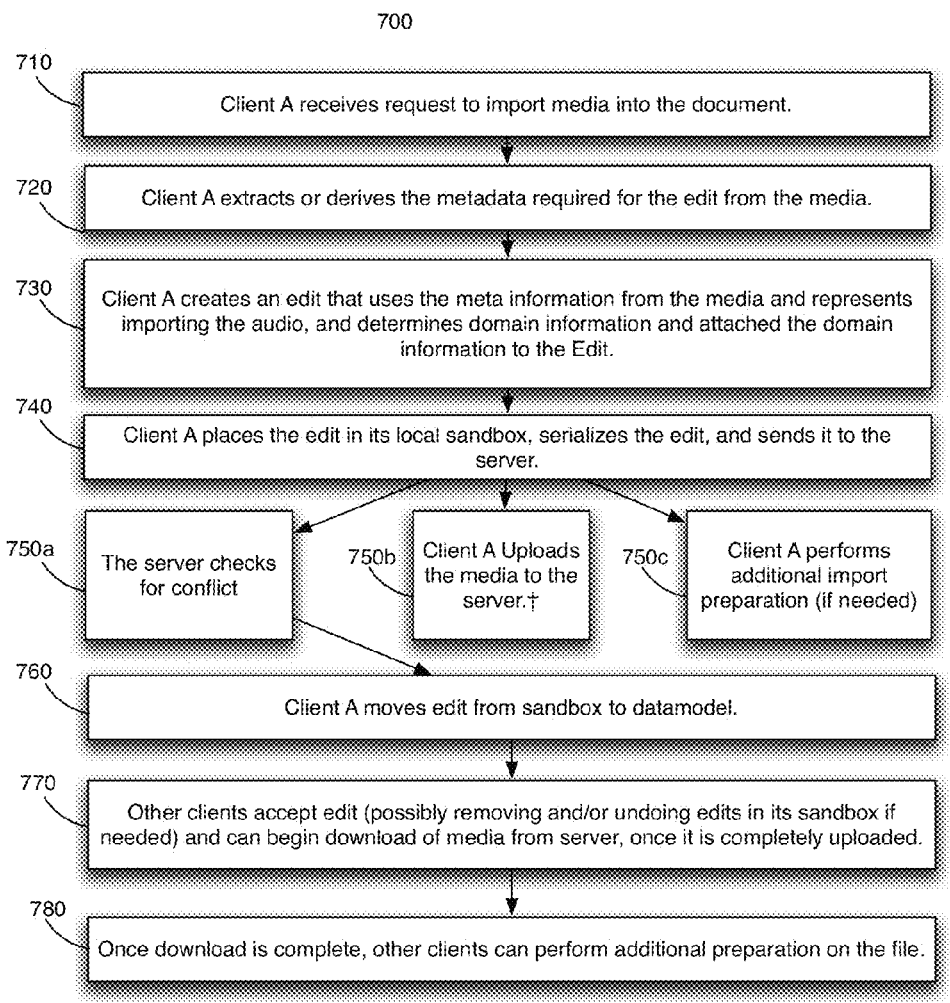
FIG. 7 is a process flow diagram for simultaneous collaboration with two clients when there are large edits to a document. according to an illustrative embodiment.

One embodiment of this process is illustrated in FIG. 7. Because this embodiment is similar to the embodiment without large amounts of data, shown in FIG. 2, we show only the case without conflicts. Moreover, we assume the clients and server (if required) have already agreed on a document and split it into possibly hierarchical, possibly overlapping domains. In 710, Client A receives a request to import media. Of course, this could be any change that involves large amounts of data, but media is a common and practical example, so we proceed with the example of importing media. In 720, Client A extracts metadata that it requires from the media, such as file length, data format, number of channels (in the case of audio data), etc. In 730, Client A creates an edit representing the import of the media. Rather than including the raw media data in the edit, the edit will include only the metadata from the media, which ensures that the edit can be represented compactly. As before, we determine domain information and attach the domain information to the edit. In 740, we place the edit in the local sandbox, serialize the edit, including domain information and media metadata, and send the edit to the server. While the server is checking for conflicts, 750$a$, it is possible to upload the file to the same or different server 750$b$, and, if required, derive additional metadata 750$c$ (see next paragraph). If a conflict is detected, Client A will be notified by the server (not shown) and forced to undo the edit and/or remove the edit from its local sandbox. This undo may also involve canceling or removing the uploaded file from the server or removing local copies of the file or references to the file. If a conflict is not detected, the server will notify all clients, so Client A can move the edit out of its sandbox and into its data model, 760, while other clients can receive the edit, process their sandbox accordingly, and begin downloading the media from the appropriate location once it is available, 770. Once the download is complete, the other clients can perform additional prep work on the file if needed, 780, comparable to the prep work performed by Client A in 750$c$. Note that it is not necessary to use an intermediate server to transfer the media; this is simply a common paradigm on today's Internet where client-to-client file sharing may be difficult. It may also be desirable to store the media in a central location for future use.

Note that after 740, Client A may be ready to receive more requests to edit data, and that after step 770, the other clients may be ready to receive more requests to edit data, even though in both cases not all metadata has been processed. U.S. patent application Ser. No. 12/535,693, the contents of which are hereby incorporated in their entirety, shows how this can be done.

Figure 8:
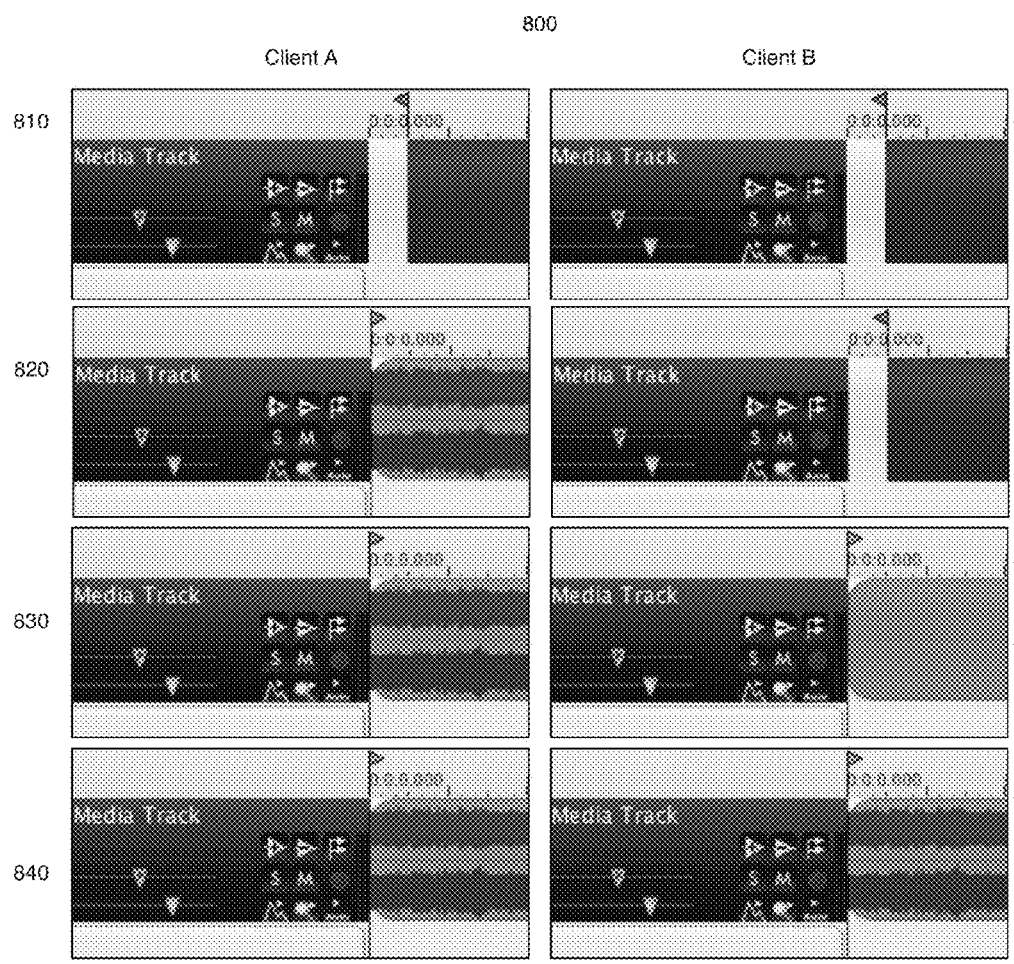
FIG. 8 illustrates how the process described in FIG. 7 might appear in the user interface of an audio or media editing application; according to an illustrative embodiment.

FIG. 8 shows how the process described in FIG. 7 might appear in the user interface of an audio or media editing application. Because we only show the steps visible to the user interface, fewer steps are shown here than in FIG. 7. In 810, Client A receives a request to import media into the document. It has not yet imported the media, so it is not visible. This is roughly comparable to 710. In 820, Client A has imported the file. In this particular case, we see that Client A has also created waveform overviews for the file. This is not required for the edit to be created, but it is shown this way for clarity. 820 may correspond to any of the states from 720 through 760. As with other parts of FIG. 8, 820 may also correspond with states from other embodiments not shown.

Once the file is imported, an edit must be created, and domain information determined and attached. The edit may further contain meta information extracted from the audio file, such as the name of the file, the length of the file and so on. The edit information is passed to the server and Client B, possibly using the mechanism and embodiment of FIG. 7. In 830, Client B has received the edit information from Client A, but the full contents of the file have not yet been completely transferred. Because the edit data includes metadata, some representation of the file is possible, though, even if some operations are not possible, such as display of waveforms and/or overviews. In this case, we see the file boundary, and some information about the file may be available (name, length, number of channels, etc), on Client B, even if the file cannot be played back and the waveforms and waveform overviews cannot be displayed yet. Once the edit is received, the file can be transferred to Client B, either directly from Client A, or via a central server, at which point the file can be made fully available, as shown in 840. In the case of this example, the file can be played and the overviews and waveforms can be displayed once the file is transferred. Note that it is possible to use any file transfer mechanism existing or to be developed and that, furthermore, the "file," here, simply represents data that need not be transferred immediately for the edit to be considered complete with respect to other edits. It need not be a "file" in the traditional sense.

Unique Identifier Operations

One of the major advantages of the techniques so far disclosed is that undo and redo operations always appear in the same order for all collaborators. Some disadvantages include the possible complexity of determining domain information, and the possibility of conflicts occurring in some cases, which may be unacceptable. We now disclose another system that may be familiar to those with knowledge of Operational Transformation; however, this system, which we call "Unique Identifier Operations" or UIO, both compliments and simplifies the technique of Operation Transformation. While it may not be seen as an ideal replacement for OT in all circumstances, we will show that it can be used as a complete replacement if desired. The advantage of this technique is that conflicts are avoided and while undo and redo are possible, for better or worse, they will not be sequenced globally without additional intervention from a centralized server. Designing a system to globally sequence edits so that undo and redo can be performed in the same order on all clients will not be discussed further here because it is and extension to the current patent that is well within the capability of anyone skilled in the relevant art.

In one of the more simple embodiments, UIO acts on a single dictionary structure. UIO requires only two operations, insert and delete, and works most naturally with dictionaries such as are commonly implemented with hash maps and trees. We will see this is not a limitation, though, merely a natural starting point. Operations, in this context, can be thought of as the building blocks of more complex edits, as users see them.

Figure 9:
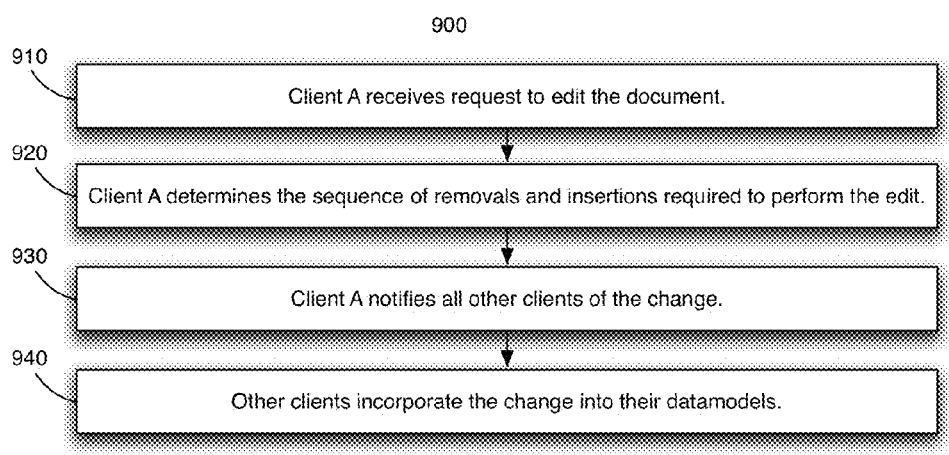
FIG. 9 is a process flow diagram for a method for inserting an edit using unique identifier operations (UIO), according to an illustrative embodiment.

FIG. 9 shows how an insertion edit using UIO might proceed. In 910, Client A receives a request to edit the document and, in 920, determines the sequence of insertions and removals required to perform the edit. In 930, Client A notifies all other clients of the change, possibly via a central server. Finally, in 940, the other clients incorporate the edit into their data-models.

Note that the only edits that are possible in this simplified embodiment are ones that do not change the structure of the document. For example, we can add items to a tree, but we cannot insert items into a list if the index in the list is the method we use to tell other collaborators how to make the change. This is because such a change would require that the operation be transformed since the indices may be different in the context of the different clients who may have received different edits.

The items we add and remove must have unique keys, such as UUIDs or some other nonce to work in the simple embodiment of FIG. 9. A simple extension of this embodiment is to have unique identifiers as part of the value, which may work whether the dictionary allows duplicate keys or not.

This simple system is extremely versatile and maintains data consistency across clients with very little additional work. To ensure consistency, we must simply ensure that no client inadvertently refers to the wrong data. This can be done by ensuring that if circumstances allow the creation of the same data, we always distinguish that data from its possible twin using unique keys. That way, users who intend to replace data will not delete it because of out of order operations. The other thing to ensure is that if a deletion operation arrives for non-existent data, we store it until the data it refers to comes in, and then take the appropriate action. This storage is not unlike the sandbox concept we used in the previous system because the deletion represents an edit that is currently "unsafe" in the current circumstances. It differs from the previous sandbox concept in that the edit information is not shown or applied to the user while in the sandbox. Note that if communication of edit information is centrally synchronized (or guaranteed to be in order), there may be no need for this sandbox.

The technique described so far can be used as a complement to existing OT techniques, which work well with ordered data, such as vectors and strings, but are more challenging with unstructured data such as unordered dictionaries and trees. Provided that the ordered and unordered data in a document are relatively independent of each other, the OT and UIO can be used side-by-side simultaneously. We will now demonstrate that UIO can also be used to tackle the problem of structured data, using the example of a text document.

Figure 10:
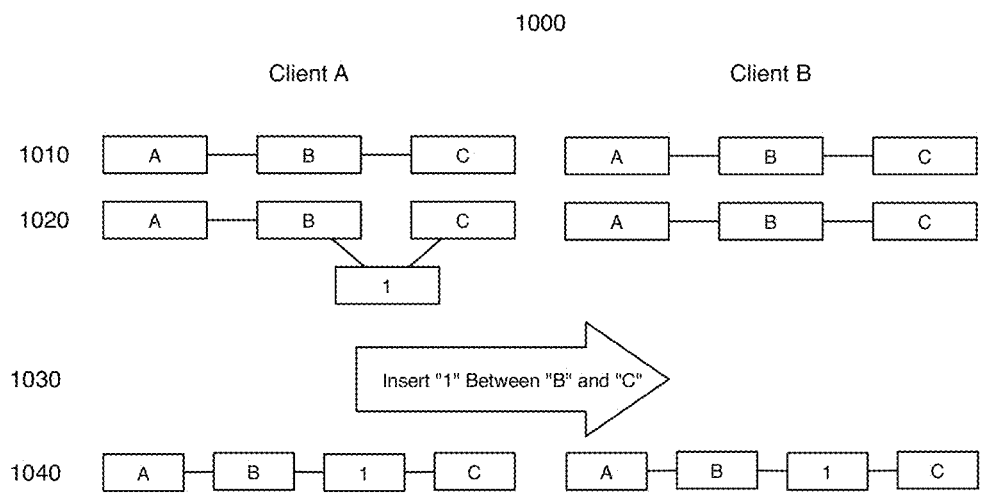
FIG. 10 illustrates how a simple insertion edit proceeds in UIO, according to an illustrative embodiment.

FIG. 10 shows how a simple insertion might proceed. We assume from the beginning that both clients, which we have arbitrarily named Client A and Client B, have agreed upon the same initial state "ABC", as shown in 1010. In 1020, Client A receives a request to edit the document, by inserting the character "1" into the string between the B and the C. In traditional OT, we would send the character and the position information, and expect the other client or clients to transform the data; however, in UIO such transforms are not necessary, even in the case of concurrent editing. In 1030, Client A sends a signal to Client B to make the change to it's data by specifying exactly where it should insert the new data: between "B" and "C". If "B" and "C" may not be unique in the document, Client A's actual should not specify the actual characters, but rather unique identifiers for the characters, such as UUIDs or some other identifier (such as client number and an arbitrarily assigned index) that can be used to distinguish each character from other characters. In the rest of this document, it is assumed that a unique identifier will be substituted when necessary, even when not explicitly stated, or when shorthand such as text characters are used. In 1040, Client B incorporates the edit into its data model.

Figure 11:
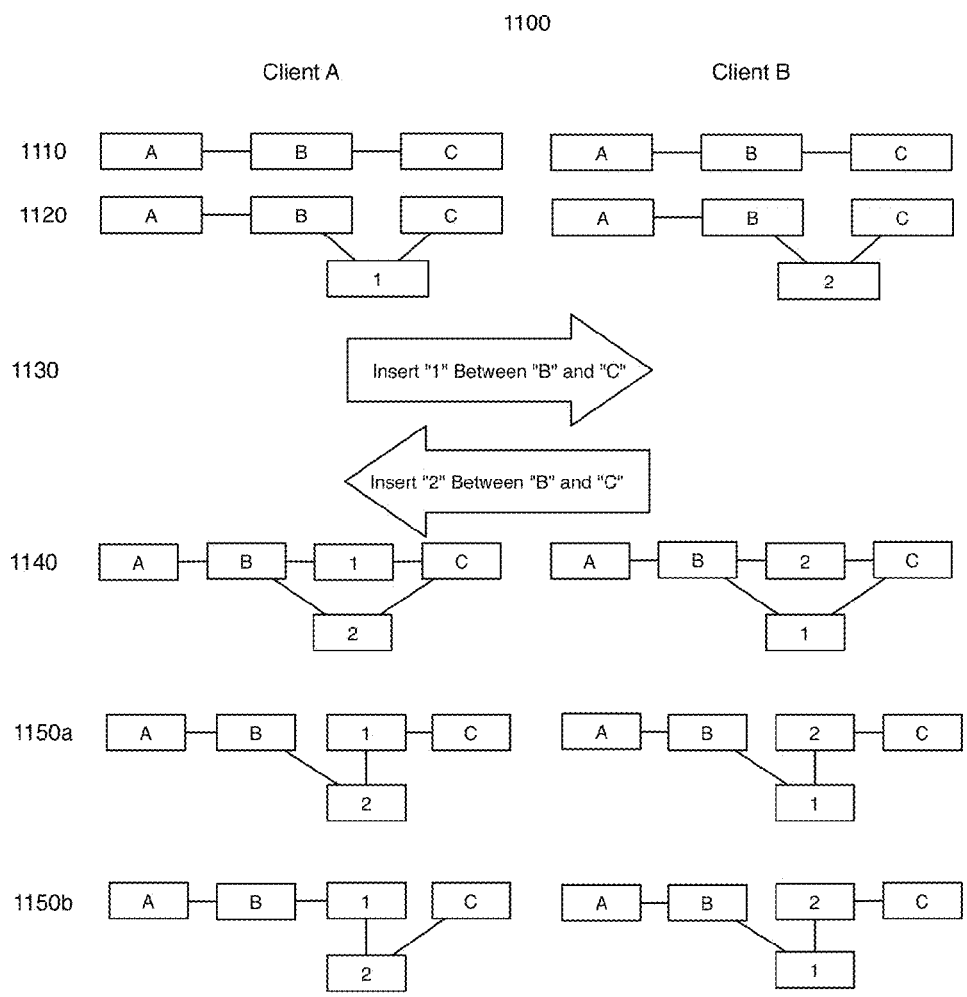
FIG. 11 illustrates how conflicts with insertions are handled in UIO, according to an illustrative embodiment.

The above example illustrates a simple case that is subject to issues with conflicts if not properly handled. FIG. 11 shows one way to handle conflicts with insertions: a rule is required for ensuring the order of data when different clients insert data between the same points without knowledge of the other insertion. In 1110 Client A and Client B start with the same string, "ABC". In 1120, Client A receives a request to insert "1" between "B" and "C" while Client B receives a request to insert "2" between "B" and "C". In 1130, the clients exchange information about the edits, and in 1140 they find themselves in ambiguous states. At this point we see that a rule based on, for example, the order of arrival of the edits, 1150*a*, will result in inconsistent state, while a rule based purely on the state of the data, 1150*b*, will quickly and easily resolve to a consistent state.

Handling deletion is slightly more complex, because a deleted entry may serve as a reference point for an in-progress insertion on another host. We will handle this issue using a concept related to our sandbox described above; however since it deals with data, not edits, and deals with outgoing information, not incoming information, we will use the terminology of visibility instead.

Figure 12:
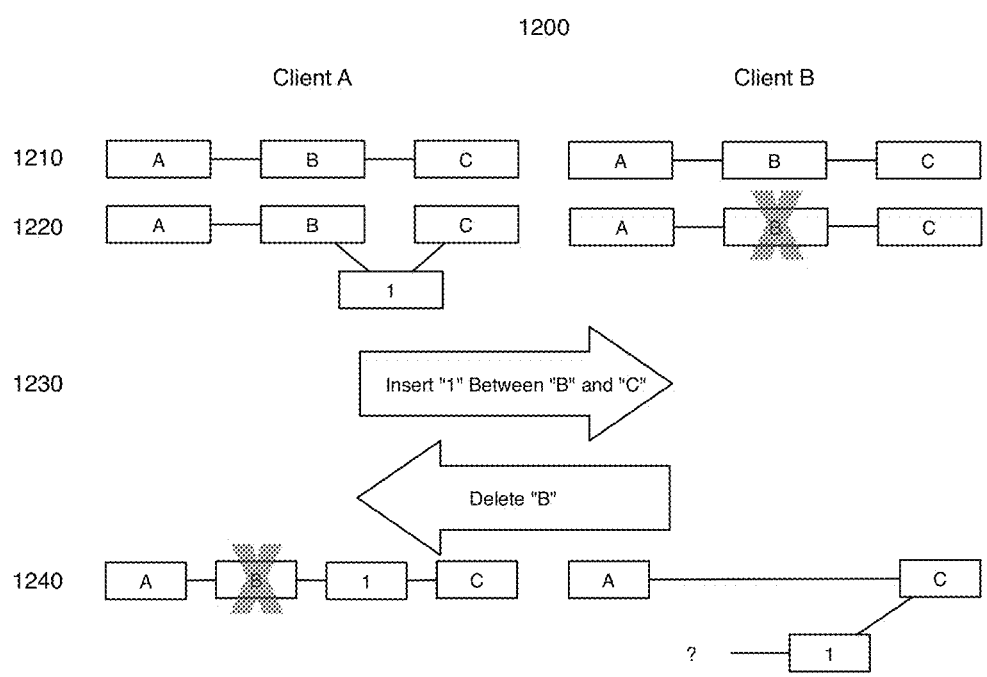
FIG. 12 illustrates a naïve and incorrect implementation of UIO.

FIG. 12 shows what can go wrong if we implement deletion naively. If we are not careful, an insertion and a deletion can conflict and cause one client to be left in an unstable state. In 1210 Client A and Client B start with the string "ABC". In 1220, Client A receives a request to insert "1" between "B" and "C", and Client B receives a request to delete "B". In 1230, the clients exchange edit information. In 1240, Client A is able to complete the edit it receives, but Client B is not able to complete the edit it received from Client A because it refers to information that is already missing.

Many OT systems attempt to overcome similar obstacles with complex, per-client data-structures that consume large amounts of memory and/or scale poorly. Some systems even have edge cases that still fail. Our proposed system is quite simple. Instead of issuing a delete call, we hide the data from the end user, but keep it in place. Once all clients acknowledge that it is hidden, we know it is safe to delete because it will no longer be used as a reference (the next visible element before or after it will be used instead) so the original client issues a delete.

FIG. 13 shows how this works. In 1310, Client A and Client B start with the string "ABC". In 1320, Client A receives a request to insert "1" between "B" and "C", and Client B receives a request to delete "B". In 1330, the clients exchange edit information and in 1340 Client A marks "B" for deletion, but does not remove it. It is left in place but hidden from the user interface. Also in 1340, Client B inserts "1" between "B" and "C". It is able to do so because unlike in FIG. 12, Client B has kept element B in place and not deleted it. As with Client A, it has marked "B" for deletion, and hidden it from the user interface, but it has not actually deleted it yet. In 1350, Client A informs Client B that it has successfully hidden "B". Once Client B has received such a signal from all Clients, it can delete "B", 1360, and inform all clients to do so as well, 1370, at which point the edit is truly complete, 1380.

FIG. 14 demonstrates a similar process, only in this case the request to insert comes after the message to hide "B" and before the message to delete it. In this case, there is no conflict because, with "B" hidden from the user, the insertion must instead go between "A" and "C". In 1410 both Client A and Client B have been initialized to the same state: representing the same string "ABC". In 1420, Client B receives a request to delete "B", and in 1430 it sends a message to all other clients to hide "B", which it does. This state is shown in 1440. In 1450, Client A sends a message that hiding B is complete. If the next thing that happens is for Client A to receive a request to insert the string "1", 1460, it will not receive a request that references the position of "B" because, although "B" is present, "B" is hidden from the UI. In this case, it receives a request to insert "1" between "A" and "C", even though these elements are not adjacent in the underlying model. Note that at this moment, the state of Client B may or may not include "B", depending on whether it has received the message to hide "B" from all clients. In 1470, Client A sends Client B the message to insert "1" between "A" and "C". In 1480, Client B is able to incorporate this insertion regardless of its state. Once Client B receives the message from all clients that "B" has been hidden, it sends the message to delete it, 1490. At this point, both clients are left with the same state, 1495.

Applicant considers all operable combinations of the embodiments disclosed herein to be patentable subject matter. The possibilities and numerous manners in which conflicts may be handled may depend on the software and document designs used, and some modifications of the methods described herein would be within the scope of one of ordinary skill in the art.

What is claimed is:

1. A method for improving the efficiency of storing at least two edits of a multimedia document, wherein the multimedia document is configured to be edited by multimedia editing program, comprising:
dividing, by the multimedia program embedded in a memory, the multimedia document into a plurality of domains, wherein each domain of the plurality of domains represents a portion of the multimedia document which is affected by at least one of the at least two edits;
selecting, by the multimedia editing program, an edited domain from the plurality of domains for each edit;
determining, by the multimedia editing program, which of the at least two edits are in conflict based on the comparison of the respective selected domains;
allowing undoing or redoing of edit operations out-of-sequence based on the comparison of the respective selected domains; and
allowing a subset of edit operations to be omitted from the undo or redo of edit operations based on comparison of the respective selected domains.

2. The method of claim 1, further comprising:
reordering the at least two edits based on the determination of which of the at least two edits are in conflict.

3. The method of claim 1, further comprising:
combining the at least two edits based on the determination of which of the at least two edits are in conflict.

4. A method for exchanging multimedia document editing data, comprising:
dividing a multimedia document into a plurality of domains, wherein each domain of the plurality of domains represents a portion of the multimedia document which is affected by at least one edit;
receiving a first request to perform a first edit on a first client;
receiving a second request to perform a second edit on a second client;
selecting, by the first client, a first edited domain from the plurality of domains for the first edit;
selecting, by the second client, a second edited domain from the plurality of domains for the second edit;
comparing, by the server, the first and the second edited domains;
enabling, by the server, at least one of the first and the second client to apply at least one of the first and the second edits based on the comparison;
allowing, by the server, undoing or redoing of edit operations out-of-sequence based on the comparison of the first and the second edited domains; and
allowing, by the server, a subset of edit operations to be omitted from the undo or redo of edit operations based on comparison of the first and the second edited domains.

5. The method of claim 2, further comprising:
comparing, by the server, a sequence of unique identifiers associated with the first and the second edited domains.

6. The method of claim 4, further comprising storing the multimedia document in one of a dictionary and a tree-like structure associated with a set of unique identifier objects.

7. The method of claim 6, further comprising:
requesting, by the first or the second clients, to insert data into an ordered list.

8. The method of claim 7 further comprising:
requesting, by the first or the second client, to delete other data from the ordered list;
hiding, by at least one of the first and the second client, their respective copies of the other data from the ordered list; and
deleting any hidden copies of the other data no longer required by the set of clients.

9. The method of claim 4, further comprising:
allowing, by the server, pending edits to propagate to the first and the second clients, thereby causing the multimedia documents on the first and the second clients to converge, wherein converging of the multimedia documents occurs when copies of the multimedia document on the first and second clients include substantially equivalent data.

10. The method of claim 9, wherein the allowing is performed subsequent to receiving, by the server, another request from one of the first client and the second client.

11. The method of claim 9, further comprising:
allowing, by the server, some edit operations to be omitted from the propagation of edits based on the comparison of the first and the second edited domains.

12. The method of claim 4, further comprising:
storing but not applying the at least one edit to the multimedia document.

13. The method of claim 4, further comprising:
enabling, by the server, one or more additional clients to apply the at least one edit.

14. A method for exchanging multimedia document editing data, comprising:
dividing a multimedia document into a plurality of domains, wherein each domain represents a portion of the multimedia document which may be affected by at least one edit;
receiving a request to perform an edit on a client;
selecting, by the client, an edited domain from the plurality of domains for the edit;
extracting, by the client, a minimal set of metadata required to represent the edit;
comparing, by the server, the edited domain with a set of other edited domains;
determining, by the server, if the edit is in conflict based on the comparison;
allowing, by the server, the transfer of additional data or metadata related to the edit, wherein the additional data or metadata is transferred subsequent to a transfer of a minimal set of metadata from the server or the client to the server or additional clients;
allowing, by the server, undoing or redoing of edit operations out-of-sequence based on the comparison of the edited domain with the set of other edited domains; and
allowing, by the server, a subset of edit operations to be omitted from the undo or redo of edit operations based on comparison of the edited domain with the set of other edited domains.

15. The method of the claim 14, wherein the additional data or metadata is at least one media file.

16. The method of claim 15, wherein the at least one media file includes at least one audio file.

17. The method of claim 15, wherein the minimal set of metadata includes a length of the at least one media file.

18. The method of claim 15, wherein the multimedia document is configured to be edited by a multimedia editing program, wherein the multimedia document contains a data structure which may be edited by at least one user of the multimedia editing program and the data structure is configured to include references to multimedia files and data from the multimedia files.

19. The method of claim 18, further comprising:
incorporating, into the multimedia document, subsequent to the allowing, the minimal set of metadata as part of the multimedia document's data and a reference to the at least one media file as part of multimedia document's references to multimedia files.

20. The method of claim 14, further comprising:
allowing, by the server, pending edits to propagate to one or more clients, thereby causing the multimedia documents on the server and the one or more clients to converge, wherein convergence means that all multimedia documents on the server and one or more clients contain substantially equivalent data.

21. The method of claim 20, wherein the propagation is performed subsequent to receiving, by the server, a request from one of the first client and the second client.

22. The method of claim 14, further comprising:
storing but not applying the edit to the multimedia document.

23. The method of claim 14, further comprising:
comparing, by the server, a sequence of unique identifiers associated with the edited domain and the set of other edited domains.

24. The method of claim 14, wherein the minimal set of metadata includes a size of the additional data or metadata.

* * * * *